US012623708B2

(12) United States Patent
Wade

(10) Patent No.: US 12,623,708 B2
(45) Date of Patent: May 12, 2026

(54) SYSTEMS FOR ANCHORING EQUIPMENT

(71) Applicant: Stephen F. Wade, Monte Sereno, CA (US)

(72) Inventor: Stephen F. Wade, Monte Sereno, CA (US)

( * ) Notice: Subject to any disclaimer, the term of this patent is extended or adjusted under 35 U.S.C. 154(b) by 418 days.

(21) Appl. No.: 18/473,124

(22) Filed: Sep. 22, 2023

(65) Prior Publication Data

US 2024/0101178 A1     Mar. 28, 2024

Related U.S. Application Data

(60) Provisional application No. 63/376,983, filed on Sep. 23, 2022.

(51) Int. Cl.
*B62B 5/04* (2006.01)

(52) U.S. Cl.
CPC ........ *B62B 5/049* (2013.01); *B62B 2501/065* (2013.01)

(58) Field of Classification Search
CPC ...... B62B 5/049; B62B 2501/065; B62B 3/00
See application file for complete search history.

(56) References Cited

U.S. PATENT DOCUMENTS

| | | | | |
|---|---|---|---|---|
| 3,701,396 | A * | 10/1972 | House ..................... | B62B 5/049 188/32 |
| 4,066,151 | A * | 1/1978 | Liebscher ................. | B60T 1/14 188/167 |
| 5,531,295 | A * | 7/1996 | Kopman ............... | B60T 11/046 188/74 |
| 12,434,754 | B2 * | 10/2025 | Long ....................... | B60B 19/12 |
| 2015/0360862 | A1 * | 12/2015 | Siepierski ............... | B62B 5/049 220/523 |

FOREIGN PATENT DOCUMENTS

| | | | | | |
|---|---|---|---|---|---|
| ES | 2686095 | T3 * | 10/2018 | ............. | B65D 19/42 |
| JP | H05112237 | A * | 5/1993 | | |
| WO | WO-2024004065 | A1 * | 1/2024 | ............... | B62B 3/00 |

* cited by examiner

*Primary Examiner* — Drew J Brown
(74) *Attorney, Agent, or Firm* — INTELLECTUAL PROPERTY LAW GROUP LLP; Juneko Jackson

(57) ABSTRACT

The present invention generally relates to a system for hands-free unlocking and locking of fixed equipment via a mobile cart from a fixed anchor base. The system includes a mobile cart deck and a fixed anchor base with a recoil device. A cable/pulley system and a lever is used to lock and unlock the cart via a trigger-operated locking mechanism. This system allows for easy detachment of fixed equipment for maintenance and access to the sides and/or rear of such equipment. Such a system can be advantageous for use in places with seismic activity and where seismic anchorage of equipment is required by the governing jurisdiction and building codes.

20 Claims, 2 Drawing Sheets

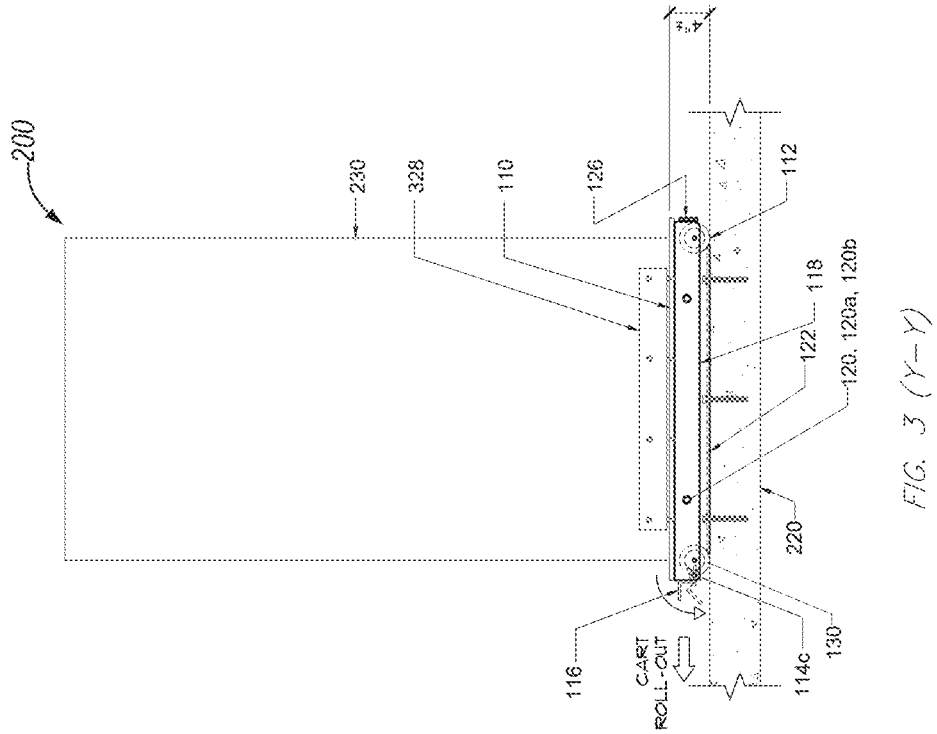
FIG. 3 (Y-Y)
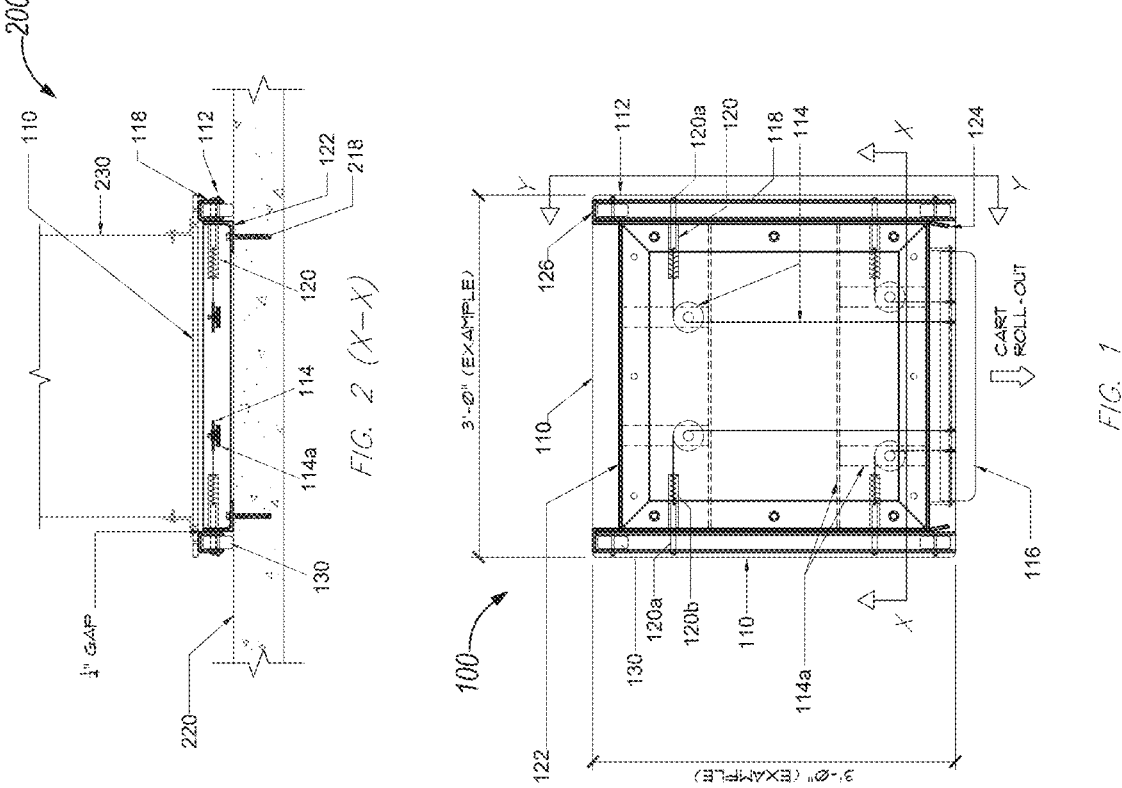
FIG. 2 (X-X)
FIG. 1

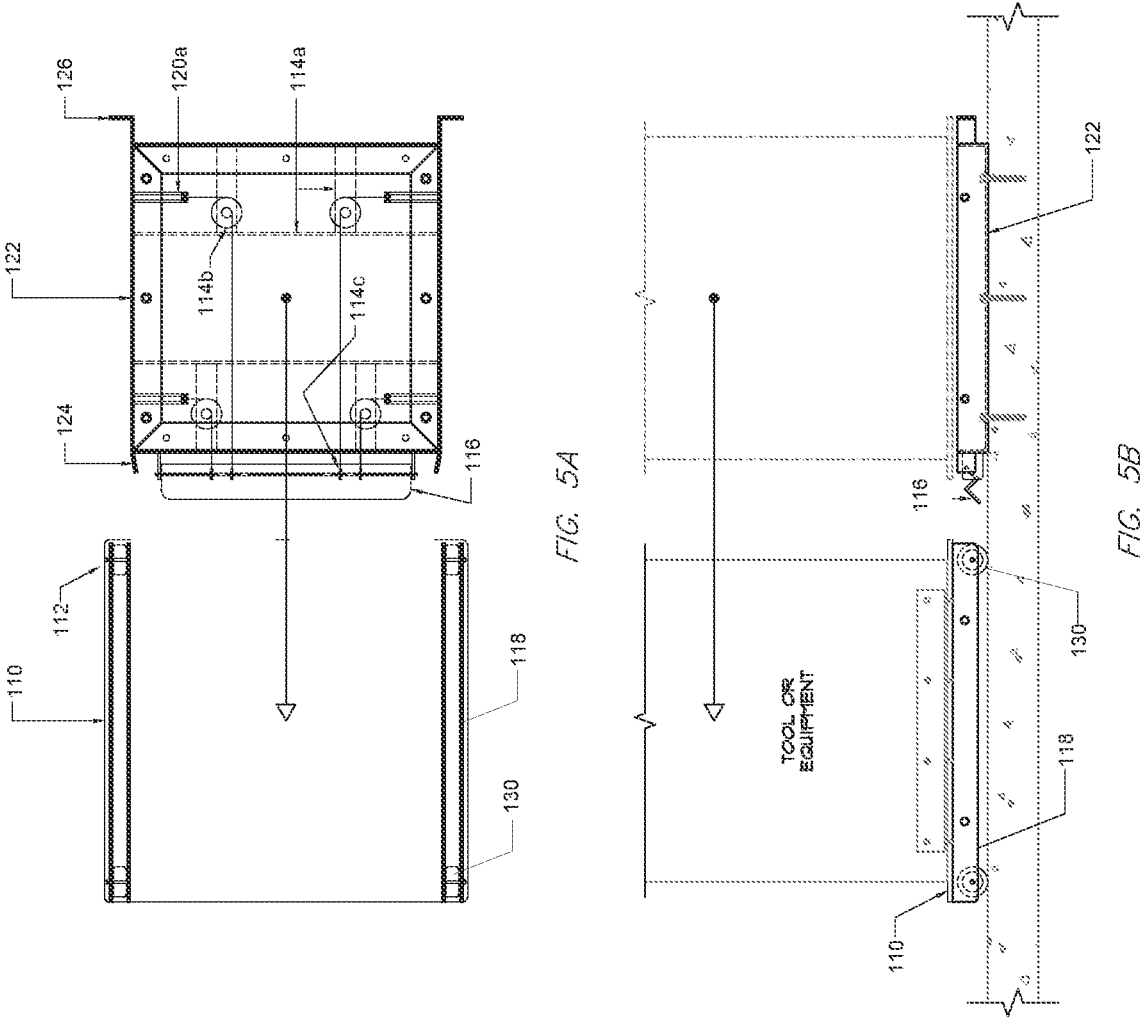
FIG. 5A
FIG. 5B
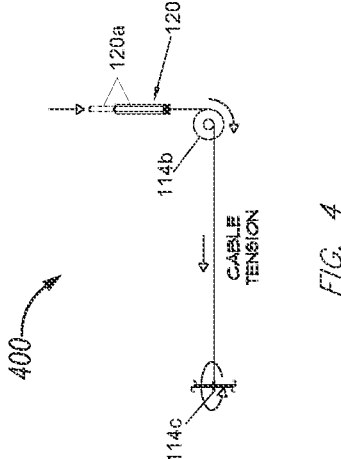
FIG. 4

SYSTEMS FOR ANCHORING EQUIPMENT

CROSS-REFERENCE TO RELATED APPLICATION

This application claims the benefit of priority under 35 U.S.C. § 119(e) based on U.S. Provisional Patent Application having Application No. 63/376,983 filed on Sep. 23, 2022, and entitled "Novel Systems for Anchoring Equipment", which is hereby incorporated herein by reference in its entirety.

FIELD OF THE INVENTION

The present invention relates to anchoring systems for equipment and carts that require positive attachment to the floor. More particularly, systems are disclosed that conveniently unlock and lock equipment and carts via a hands-free trigger-operated locking mechanism to allow for servicing and access to the equipment that would otherwise be limited due to fixed attachment. Such a system would be useful in places with seismic activity.

BACKGROUND OF THE INVENTION

In locations having high seismic activity, efforts are sought to provide seismic anchorage systems for equipment which are easily removable for equipment servicing, access or maintenance. Presently, equipment that require seismic anchorage usually entail anchoring the equipment or cart directly to a supporting structure or floor. Mechanisms to unlock the equipment or cart from the anchorage position usually require manually detaching each connection of anchorage from the supporting structure for release.

Typically, seismic anchorage of equipment is custom designed for each piece of equipment and require additional tools to detach the equipment to allow moving the equipment for utility or servicing. These solutions often require a specialized technician to correctly reinstall anchorage of the equipment or cart.

Although the above-mentioned systems are adequate to anchor equipment, there are disadvantages. Typically, to release or unbolt the equipment or cart, two or four connections must be detached using available hardware (such as removable bolts and pins), and usually require additional tools for release. Attaching and re-attaching the equipment or cart for anchorage, can result in connection hardware being misplaced or lost, or improper reattachment rendering the equipment unanchored. Additionally, anchoring and re-anchoring such equipment can be tedious, time consuming, difficult and often require professional installation which can be costly. Not being able to have easy access to service equipment or carts (such as data racks) that often need to be fixed to the floor (i.e. anchored), can be frustrating, time consuming and potentially dangerous.

For the foregoing reasons, there exists a need to find a solution to provide an unlocking and locking anchoring system for equipment, that is more efficient, less expensive, and can address the above-mentioned problems.

Furthermore, it would be advantageous to have a system that is easy to install, can be mass produced, does not require additional tools, is reasonably priced and easy to scale up and convenient to purchase (i.e. "off the shelf"). Additionally, it would be advantageous to have seismic anchorage systems that allow the equipment to be easily moved for service access without a technician, tools, or removeable, loose attachment parts.

These features, advantages and other embodiments of the present invention are further made apparent in the remainder of the present description, appended claims and drawings, to those of ordinary skill in the art.

SUMMARY

The present invention is directed to systems affiliated with anchoring equipment or a cart via a trigger-operated locking mechanism. More specifically, the systems are directed to unlocking and locking equipment or a cart from an anchoring system. According to an embodiment of the present invention, there is a locking system for a mobile cart, the system includes a cart deck with a wheel base; a cable/pulley assembly and a lever; and, a fixed anchor base to accommodate the cart deck with means to secure to a foundation.

The wheel base includes at least four wheels with corresponding caster rails. The cable pulley system includes recoil devices (comprising a recoil member and a recoil spring). The recoil member can be a spring pin and typically is mounted in the fixed anchor base and has two ends connected respectively with the wheel base and the recoil spring. The cable/pulley assembly is capable of selectively engaging/disengaging the recoil spring pin with a hole in the caster rail to lock and unlock the cart from the fixed anchor base. The lever connected to the cable pulley system is capable of selectively engaging and disengaging the spring pins from the holes in the caster rails to lock and unlock the cart from the fixed anchor base.

Preferably, the lever is a pedal, and when pressed or stepped on, the cable/pulley assembly engages with locking assemblies in the recoil device. To unlock from the fixed anchor base, when the pedal is pressed, the cable/pulley engages by coiling the recoil spring resulting in disengaging and retracting the extended spring pin from the hole in the caster rail. The mobile cart remains unlocked until the pedal is pressed again, extending the spring such that the connected spring pin or rod is extended and the cart is locked into the fixed anchor base.

In one embodiment of the present invention, a system for unlocking and locking a mobile cart from an anchor base is disclosed. The system comprising: a cart deck comprising a wheel base, the wheel base comprising a plurality of wheels with corresponding caster rails; a cable/pulley assembly comprising at least a recoil device, the recoil device comprising a recoil member and a recoil spring; a lever; and, a fixed anchor base to accommodate the cart deck with means to secure to a foundation; whereby the lever is connected to the cable pulley assembly capable of selectively engaging and disengaging the recoil member from the caster rail to lock and unlock the cart from the anchor base.

In another embodiment of the present invention, a system for unlocking and locking a mobile cart from an anchor base is disclosed. The system comprising: a cart deck comprising a wheel base, a cable/pulley assembly and a lever; wherein the wheel base comprises a plurality of wheels with corresponding caster rails, and the cable/pulley assembly comprises at least a recoil device, the recoil device comprising a recoil member and a recoil spring; and, a fixed anchor base to accommodate the cart deck with means to secure to a foundation; whereby the lever is connected to the cable pulley assembly capable of selectively engaging and disengaging the recoil member from the caster rail to lock and unlock the cart from the anchor base.

In yet another embodiment of the present invention, a system for unlocking and locking a mobile cart from an anchor base is disclosed. The system comprising: a cart deck comprising a wheel base, the wheel base comprising a plurality of wheels with corresponding caster rails; and, a fixed anchor base to accommodate the cart deck with means to secure to a foundation, the fixed anchor base further comprising a cable/pulley assembly and a lever, wherein the cable/pulley assembly comprises at least a recoil device, the recoil device comprising a recoil member and a recoil spring, whereby the lever is connected to the cable pulley assembly capable of selectively engaging and disengaging the recoil member from the caster rail to lock and unlock the cart from the anchor base.

BRIEF DESCRIPTION OF THE DRAWINGS

In order to describe embodiments of the present invention more fully, reference is made to the accompanying drawings. These drawings are not to be considered limitations in the scope of the invention, but are merely illustrative.

FIG. 1 illustrates a top view of a schematic system of a locking system to anchor a mobile cart; according to an embodiment of the present invention.

FIG. 2 illustrates a cross section X-X front view of a locking system for a mobile cart; according to an embodiment of the present invention.

FIG. 3 illustrates an alternate cross section Y-Y side view of a locking system for a mobile cart; according to an embodiment of the present invention.

FIG. 4 illustrates a view of the mechanism of a locking system for a mobile cart; according to an embodiment of the present invention.

FIG. 5A illustrates a top view of a locking system for a mobile cart rolling out; according to an embodiment of the present invention.

FIG. 5B illustrates a side view of a locking system for a mobile cart rolling out; according to an embodiment of the present invention.

These and other features, aspects, and advantages of the present invention will become better understood with reference to the following description.

DETAILED DESCRIPTION OF EMBODIMENTS

The description and the drawings of the present disclosure focus on one or more preferred embodiments of the present invention, and describe exemplary optional features and/or alternative embodiments of the present invention. The description and drawings are for the purpose of illustration and not limitation. Those of ordinary skill in the art would recognize variations, modifications and alternatives which are also within the scope of the invention.

The present invention addresses the aforementioned need for a locking device to secure equipment or carts. More specifically, the invention generally relates to systems that provide an anchoring system for equipment or carts on casters that can be locked/unlocked into place with a spring ball lock (i.e. loaded catches or pins) that can be removed without tools. Release of the cart for use or equipment servicing is easily achieved with a simple lever or pedal at the front of the cart that can be operated by for example, a human foot. Once the lever or pedal is released, the cart remains unlocked and can be rolled out allowing access to the sides and the back of the equipment. When the equipment is done being used or serviced, the cart can be rolled back into place, and when the lever or pedal is pressed again, the spring loaded pins lock the cart back into place to an anchor base (fixed brackets that are attached to the floor).

In an embodiment of the present invention, the systems are provided to secure equipment without the use of any additional tools and hands free.

Referring now to FIG. 1 a schematic diagram illustrating a top view of system 100 to unlock/lock and anchor a mobile cart is provided according to an embodiment of the present invention. Preferably, the system 100 comprises a cart deck 110 with a wheel base 112; a cable/pulley assembly 114 and a footstep lever 116. Typically, the wheel base 112 is mounted to the underside surface of the cart deck 110. Preferably, the wheel base 112 includes a plurality of wheels 130 with corresponding caster rails 118. Preferably, the wheel base 112 includes at least two wheels 130, preferably four wheels 130. In an embodiment of the present invention, the wheel base 112 can include wheels 130 that are casters and are capable of swiveling. In an embodiment of the present invention the cart deck 110 typically is horizontal and rectangular in shape. The cart deck 110 can be made of any material known to those skilled in the art including metal, composite, wood, plastic etc. Preferably, the cart deck 110 is a metal and is made of aluminum, steel or composite. In an embodiment of the present invention, the cart deck 110 includes pre-drilled holes, tapped or T-slot to accommodate various methods of equipment attachment.

In a preferred embodiment of the present invention, the cable/pulley assembly 114 includes a recoil device 120. Preferably, the recoil device 120 comprises a recoil member 120a and a recoil spring 120b. In a most preferred embodiment of the present invention, the recoil spring 120b has two ends connected respectively with the cable/pulley assembly 114 and the recoil member 120a. The recoil member 120a connected to the recoil spring 120b, can be a rod or pin that is capable of moving.

In yet a preferred embodiment of the present invention, the cable/pulley assembly 114 is capable of selectively engaging/disengaging recoil device 120 by means of the recoil spring 120b interacting with the connected recoil member (rod or pin) 120a by selectively engaging with and disengaging with a hole in a caster rail 118 attached to the cart deck 110.

In another embodiment of the present invention, the system comprises a fixed anchor base 122 to accommodate the cart deck 110. The fixed anchor base 122 comprises at least a one piece bracket anchored to a supporting floor structure. Preferably, the at least one piece bracket has four sides and is square or rectangular in shape. More preferably, the fixed anchor base 122 is the same width and length as the cart deck 110.

According to an embodiment of the present invention, the lever 116 is a pedal and connected to the cable/pulley assembly 114 capable of selectively engaging and disengaging the recoil device spring pins 120a from the corresponding caster rail 118 to engage and re-engaging the cart to lock and unlock the cart from the anchor base 122. In an embodiment, engaging the lever 116 (for example a single step/tap) will secure the cart to stay in the released position (pins 120a are retracted) for cart roll out and once the cart is rolled back into place the lever 116 (when pressed) re-engages the spring pins to return to a locked position. According an embodiment, a set of cable/pulley system support plates or support brackets 114a serve to support the cable/pulley system.

In an alternative embodiment of the present invention, the fixed anchor base 122, can further include tapered guides 124 to assist with alignment of the cart to roll in. The tapered guides 124 are integral with the anchor base 122 and can be made of the same material. In an embodiment, the tapered guides 124 extend from a front end of the anchor base 122 and can be approximately two inches in length. Other lengths of the guides 124 are contemplated.

Referring now to FIG. 2 a schematic diagram illustrating a different view of system 200 to unlock/lock and anchor a mobile cart is provided according to an embodiment of the present invention. As shown, this front sectional view is taken along the X-X line of FIG. 1 and illustrates an example of a tool or equipment 230 which may be anchored to the cart deck 110. Preferably, the system 200 comprises a cart deck 110 with a wheel base 112. Typically, the wheel base 112 includes wheels 130 with corresponding caster rail 118.

According to a preferred embodiment of the present invention, the system comprises a fixed anchor base 122 provides means to secure connect and/or bolt to a foundation 220. Typically, the foundation 220 can be any hard surface known to those skilled in the art. Preferably, the hard surface is concrete.

In an embodiment of the present invention, the anchor base 122 is made of steel construction with holes to accommodate means of securing to the foundation 220 via concrete anchors or bolts 218.

In a most preferred embodiment of the present invention, the maximum gap between the fixed anchor base 122 and the caster rail 118 is ¼" to allow for mis-alignment without binding when the cart is rolled in/out of the fixed anchor base 122.

Referring now to FIG. 3 a schematic diagram illustrating an alternative side view of system 200 to unlock/lock and anchor mobile equipment or cart is provided according to an embodiment of the present invention. As shown, this side view is taken along the Y-Y line of FIG. 1 and illustrates an example of a tool or equipment 230 which may be anchored to the cart deck 110. Preferably, the system 200 comprises a cart deck 110 with a wheel base 112 a cable/pulley assembly 114 and a lever 116.

Typically, the wheel base 112 includes wheels 130 and/or casters with corresponding caster rails 118 attached to the cart deck 110. Typically, the wheel base 112 is mounted to the underside surface of the cart deck 110. Preferably, the wheel base 112 includes a plurality of wheels 130 with corresponding caster rails 118. Preferably, the wheel base 112 includes at least two wheels 130. More preferably, the wheel base 112 has four wheels 130. In an embodiment of the present invention, the wheel base 112 can include wheels 130 that are casters and are capable of swiveling. In an embodiment of the present invention the cart deck 110 typically is horizontal and rectangular in shape. In an embodiment of the present invention the cart deck 110 typically can be made of any material known to those skilled in the art including metal, composite, wood, plastic etc. Preferably, the cart deck 110 is a metal and is made of aluminum, steel or composite. In an embodiment of the present invention, the cart deck 110 includes pre-drilled holes, tapped or T-slot to accommodate various methods of equipment attachment.

In a preferred embodiment of the present invention, the cable/pulley assembly 114 includes a recoil device 120. Preferably, the recoil device comprising a recoil member 120a and a recoil spring 120b. The recoil member 120a can be a spring rod or spring pin that is capable of engaging with holes in the caster rail 118.

In yet a preferred embodiment of the present invention, the cable/pulley assembly 114 is capable of selectively engaging/disengaging recoil device 120 by means of the recoil spring interacting with the connected recoil member spring pin 120a by selectively engaging with and disengaging with a hole in a caster rail 118 attached to the cart deck 110.

In another embodiment of the present invention, the system comprises a fixed anchor base 122 to accommodate the cart deck 110. According to an embodiment, the fixed anchor base 122 comprises four steel angles welded together to form a single piece, four-sided bracket. In other embodiments, the fixed anchor base 122 can be constructed differently, having one or more brackets, or having at least two opposing brackets which serve as a means for anchoring to the foundation 220. According to an embodiment of the present invention, the lever 116 is a pedal or a foot-step release and connected to the cable/pulley assembly 114 capable of selectively engaging and disengaging the recoil device spring pin 120a from the corresponding caster rail 118 to engage and re-engaging the cart to lock and unlock the cart from the fixed anchor base 122.

According to a preferred embodiment of the present invention, the system comprises the fixed anchor base 122 to provide means to secure connect and/or bolt to a foundation 220. Typically, the foundation 220 can be any hard surface known to those skilled in the art. Preferably, the hard surface is concrete.

In an embodiment of the present invention, the fixed anchor base 122 is made of steel construction with holes to accommodate means of securing to the foundation 220 via concrete anchors or bolts.

In a most preferred embodiment of the present invention, the maximum gap between the fixed anchor base 122 and the caster rail 118 is ¼" to allow for misalignment without binding when the cart is rolled in/out of the fixed anchor base 122.

In alternative embodiment of the present invention, the system 200 can further include cart roll stop bracket 126 attached to the fixed anchor base 122. The cart roll stop bracket 126 is used to stop the cart deck 110 from rolling too far back.

In yet still another alternative embodiment of the present invention, the system 200 can further include one or more custom made attachment brackets 328 for attaching tools or equipment 230 to the cart deck 110. As appreciated, the custom made attachment bracket 328 can be any bracket known to those skilled in the art to attach various tools and/or equipment fabricated as needed. The equipment or tools 230 can be anything that is needed to be moved around on a cart. (Examples can be medical equipment, tools, data racks, etc.)

Referring now to FIG. 4 a schematic diagram illustrating the spring pin mechanism of the locking system 400 for the mobile cart as described in FIGS. 1-3 according to an embodiment of the present invention.

Typically, the lever 116 is a pedal or a foot-step release and connected to the cable/pulley assembly 114 capable of selectively engaging and disengaging the recoil device spring pin 120a by extension/retraction from the corresponding caster rail to engage and re-engaging the cart to lock and unlock the cart from the anchor base. In a preferred embodiment, when the lever or foot-step release 116 is pressed, it rotates the cable/pulley (e.g. a foot step pulley 114c) resulting in cable tension to a transfer pulley 114b connected to the recoil device spring pin 120a resulting in the recoil device spring pin 120a extension/retraction resulting in engaging and disengaging of the cart. The rotation direction of the cable/pulley system 114 rotates toward the foot pedal for spring pin retraction and away from the foot pedal for spring pin extension.

Referring now to FIG. 5A, a schematic diagram illustrating a top view of the system 500 to unlock/lock and anchor a mobile cart rolling out as described in FIGS. 1-3 using the mechanism of FIG. 4 according to an embodiment of the present invention. As illustrated in system 500, the cart deck 110 is shown in a fully rolled out position from the fixed anchor base 122.

Preferably, the system 500 comprises a cart deck 110 with a wheel base 112; a cable/pulley assembly 114 and a lever 116. Typically, the wheel base 112 includes wheels 130 with corresponding caster rail. In an embodiment, the cable/pulley assembly 114 comprises one or more pulley support brackets/plates 114a supporting the cable/pulley assembly, a transfer pulley 114b connected to a cable engaged with the recoil device 120 on one end of the cable, and a foot step pulley 114c connected to the cable at another end of the cable; the foot step pulley 114c being rotated by connection to the lever 116.

In a preferred embodiment of the present invention, the cable/pulley assembly 114 includes a recoil device 120. Preferably, the recoil device comprising a recoil member 120a and a recoil spring 120b. The recoil member 120a connected to the recoil spring 120b can be a rod or spring pin that is capable of moving. Referring to FIG. 5, lever 116 is pressed, interacting with the cable/pulley assembly 114a, 114b, 114c resulting in the spring pin 120a being in a retracted position for the cart deck 110 to roll out.

In yet a preferred embodiment of the present invention, the cable/pulley assembly 114 is capable of selectively engaging/disengaging spring pin 120a by means of the recoil spring interacting with the connected spring pin 120a by selectively engaging with and disengaging with a hole in the caster rail 118 attached to the cart deck 130.

In another embodiment of the present invention, the system 500 comprises a fixed anchor base 122 to accommodate the cart deck 110. The fixed anchor base 122 comprises at least two brackets. In other embodiments, the fixed anchor base 122 comprises at least a two sided, single piece bracket. According to an embodiment of the present invention, the lever 116 is a pedal and connected to the cable/pulley assembly 114 (114b, 114c) capable of selectively engaging and disengaging the recoil device spring pins 120a from the corresponding caster rail 118 to engage and re-engaging the cart to lock and unlock the cart from the anchor base 122.

In an alternative embodiment of the present invention, the fixed anchor base 122, can further include tapered guides 124 to assist with alignment of the cart to roll in. The anchor base can further include a cart roll stop bracket 126 as a back stop.

Typically, the lever 116 is a pedal or a foot-step release and connected to the cable/pulley assembly 114 (114b, 114c) capable of selectively engaging and disengaging the recoil device spring pin 120a from the corresponding caster rail 118 to engage and re-engaging the cart to lock and unlock the cart from the anchor base. In a preferred embodiment, when the lever or foot-step release 116 is pressed, or pushed downward, it rotates foot step pulley 114c resulting in cable tension to transfer pulley 114b connected to the recoil device spring pin 120a, resulting in the spring pin 120a being in a retracted position for the cart deck 110 to roll out. According to an embodiment of the present invention, it is understood that the spring pin 120a remains in a retracted position until the foot-step release 116 is pressed again.

Referring now to FIG. 5B, a schematic diagram illustrating a side view of the system 500 to unlock/lock and anchor a mobile cart rolling out as described in FIGS. 1-3 and 5A using the mechanism of FIG. 4 according to an embodiment of the present invention. As illustrated in system 500, the cart deck 110 is shown loaded with a tool or equipment and in a fully rolled out position from the fixed anchor base 122.

Preferably, when the lever 116 (or pedal, foot-step release) is pressed, or pushed downward, the lever 116 remains in a retracted position until cart deck 110 is rolled back into position. In a preferred embodiment, once the cart deck 110 is rolled back into position above the anchor base 122, pressing on the lever or foot-step release 116, it rotates the foot step pulley 114c resulting in cable tension to transfer pulley 114b connected to the recoil device spring pin 120a resulting in the spring pin being in an extended position for the cart deck 110 to lock in place. According to an embodiment of the present invention, it is understood that the spring pin 120a remains in an extended position until the foot-step release 116 is pressed again.

FIGS. 1-5 illustrate the simplest possible locking anchoring system, although those in the art can appreciate that other embodiments of the present invention can include different configurations such as additional brackets for further attaching tools to the cart.

As can be appreciated, in a preferred embodiment of the present invention (FIGS. 1-5) when the foot pedal lever is stepped on, the lever engages the cable/pulley assembly to disengage the locking assemblies by disengaging the spring pins extended in the caster rails by coiling the springs to unlock when the lever or pedal is pressed; and recoiling and extending the spring such that the connecting rod is extended and locked into place.

According to a preferred embodiment of the present invention, first, the foot step is pressed which engages all four cable/pulleys to simultaneously disengage or unlock the respective four spring pins by retraction from their locked position their corresponding caster rails, thus releasing the cart from the anchored base. The four pins remain in the retracted position allowing the cart to be rolled out for use (i.e. servicing, replacing equipment/tool, etc.)

In accordance with another preferred embodiment of the present invention, when servicing or use of the cart is complete, the cart is then rolled back to its original position and "stops" when the cart makes contact with a stop bracket attached to the back of the fixed anchor base, thus preventing the cart from rolling back too far. The footstep is then pressed again to release the retracted locked pins. Next, the lock pins extend back into the caster rails and remain extended to secure the equipment or cart in place.

In a typical embodiment of the present invention, once the cart is released or unlocked from the fixed anchor base, the outward movement of the cart is unlimited.

Thus, according to an embodiment of the present invention, the first press on the foot lever locks the spring pins in a retracted position; and, a second press on the foot step lever allows the spring pins to extend out to a locked position, thus anchoring the equipment and cart to the supporting floor structure.

Referring now to FIGS. 1-5, in one preferred embodiment of the present invention, the system comprises a cart deck with a wheel base; a cable/pulley assembly and a footstep lever. The system also comprises a fixed anchor base to accommodate the cart deck. The fixed anchor base comprises at least two brackets. Typically the at least two anchor brackets are parallel to each other. According to an embodiment of the present invention, the lever is a pedal and connected to the cable/pulley assembly capable of selectively engaging and disengaging the recoil device spring pins from the corresponding caster rail to engage and re-engaging the cart to lock and unlock the cart from the anchor base.

In a preferred embodiment of the present invention, the cable/pulley assembly with the foot step lever is attached to the fixed anchor base of the system that accommodates the cart deck. Preferably, the cable/pulley assembly with the footstep lever is situated between the two brackets (or between opposing bracket sides) of the anchor base. In this embodiment, the cart deck is secured wherever the anchor base of the system is.

In yet an alternate preferred embodiment of the present invention, the cable/pulley assembly with the foot step lever is attached to the underside of the cart deck of the system. In this embodiment, the cart deck can be locked anywhere the cart deck needs to be parked and does not require the anchor base.

In one embodiment of the present invention, a system for unlocking and locking a mobile cart from an anchor base is disclosed. The system comprising: a cart deck comprising a wheel base, the wheel base comprising a plurality of wheels with corresponding caster rails; a cable/pulley assembly comprising at least a recoil device, the recoil device comprising a recoil member and a recoil spring; a lever; and, a fixed anchor base to accommodate the cart deck with means to secure to a foundation; whereby the lever is connected to the cable pulley assembly capable of selectively engaging and disengaging the recoil member from the caster rail to lock and unlock the cart from the anchor base.

In another embodiment of the present invention, a system for unlocking and locking a mobile cart from an anchor base is disclosed. The system comprising: a cart deck comprising a wheel base, a cable/pulley assembly and a lever; wherein the wheel base comprises a plurality of wheels with corresponding caster rails, and the cable/pulley assembly comprises at least a recoil device, the recoil device comprising a recoil member and a recoil spring; and, a fixed anchor base to accommodate the cart deck with means to secure to a foundation; whereby the lever is connected to the cable pulley assembly capable of selectively engaging and disengaging the recoil member from the caster rail to lock and unlock the cart from the anchor base.

In yet another embodiment of the present invention, a system for unlocking and locking a mobile cart from an anchor base is disclosed. The system comprising: a cart deck comprising a wheel base, the wheel base comprising a plurality of wheels with corresponding caster rails; and, a fixed anchor base to accommodate the cart deck with means to secure to a foundation, the fixed anchor base further comprising a cable/pulley assembly and a lever, wherein the cable/pulley assembly comprises at least a recoil device, the recoil device comprising a recoil member and a recoil spring, whereby the lever is connected to the cable pulley assembly capable of selectively engaging and disengaging the recoil member from the caster rail to lock and unlock the cart from the anchor base.

It can be appreciated according to an embodiment of the present invention, that the system can be used in utility carts, shopping carts, luggage carts, strollers, trolleys etc.

In summary, the present invention provides systems to remove equipment or a cart from an anchored locked position, that is quick, efficient, not time consuming and inexpensive. Advantages of the system according to preferred embodiments of the present invention over conventional arrangements are facilitated by the use of a lever or latch, since the systems disclosed do not require additional tools and can be "hands free." Additionally, the system of the present invention is configured to provide ease of access to the equipment, so that no side access is required to detach the equipment, which allows the equipment to be placed very close to together, saving space in the working environment. The "SWSI" cart of the present invention would be an "off the shelf" device and would be pre-engineered for seismic anchorage of various equipment.

Throughout the description and drawings, example embodiments are given with reference to specific configurations. It can be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A system for unlocking and locking a mobile cart from an anchor base, the system comprising:
   a cart deck comprising a wheel base, the wheel base comprising a plurality of wheels with corresponding caster rails;
   a cable/pulley assembly comprising at least a recoil device, the recoil device comprising a recoil member and a recoil spring;
   a lever; and
   a fixed anchor base to accommodate the cart deck with means to secure to a foundation;
   whereby the lever is connected to the cable pulley assembly capable of selectively engaging and disengaging the recoil member from the caster rail to lock and unlock the cart from the fixed anchor base.

2. The system according to claim 1, wherein the cart deck comprises a material including metal, composite, wood, plastic and mixtures thereof.

3. The system according to claim 2, wherein the metal includes aluminum, steel, zinc, cadmium, copper, brass, nickel, stainless steel and mixtures thereof.

4. The system according to claim 1, wherein the recoil member is a rod or a spring pin.

5. The system according to claim 1, wherein the cable/pulley assembly and the lever are mounted to the fixed anchor base.

6. The system according to claim 5, wherein the recoil device is mounted to the fixed anchor base, whereby the recoil spring comprises two ends, a first end connected to the fixed anchor base and a second end connected to the recoil member.

7. The system according to claim 1, wherein the lever includes a pedal or foot-step release.

8. The system according to claim 1, wherein the wheel base is mounted to an underside of the cart deck.

9. The system according to claim 1, wherein the wheel base includes wheels that include casters and are capable of swiveling.

10. The system according to claim 1, wherein the cart deck is horizontal and rectangular.

11. The system according to claim 1, wherein the fixed anchor base includes tapered guides.

12. The system according to claim 1, further including one or more attachment brackets for attaching tools or equipment.

13. The system according to claim 1, wherein the cable/pulley assembly and lever are mounted beneath the cart deck to an underside of the cart deck.

14. The system according to claim 13, wherein the recoil device is mounted to the underside of the cart deck, whereby the recoil spring comprises two ends, a first end connected to the underside of the cart deck and a second end connected to the recoil member.

15. A system for unlocking and locking a mobile cart from an anchor base, the system comprising:

a cart deck comprising a wheel base, a cable/pulley assembly and a lever;

wherein the wheel base comprises a plurality of wheels with corresponding caster rails, and the cable/pulley assembly comprises at least one recoil device, the recoil device comprising a recoil member and a recoil spring; and a fixed anchor base to accommodate the cart deck with means to secure to a foundation;

whereby the lever is connected to the cable pulley assembly capable of selectively engaging and disengaging the recoil member from the caster rail to lock and unlock the cart from the anchor base.

16. The system according to claim 15, wherein the lever includes a pedal or foot-step release.

17. The system according to claim 15, wherein the cart deck comprises a material including metal, composite, wood, plastic and mixtures thereof.

18. The system according to claim 17, wherein the metal includes aluminum, steel, zinc, cadmium, copper, brass, nickel, stainless steel and mixtures thereof.

19. A system for unlocking and locking a mobile cart from an anchor base, the system comprising:

a cart deck comprising a wheel base, the wheel base comprising a plurality of wheels with corresponding caster rails; and a fixed anchor base to accommodate the cart deck with means to secure to a foundation, the fixed anchor base further comprising a cable/pulley assembly and a lever, wherein the cable/pulley assembly comprises at least one recoil device, the recoil device comprising a recoil member and a recoil spring, whereby the lever is connected to the cable pulley assembly capable of selectively engaging and disengaging the recoil member from the caster rail to lock and unlock the cart from the anchor base.

20. The system according to claim 19, wherein the lever includes a pedal or foot-step release.

\* \* \* \* \*